UNITED STATES PATENT OFFICE.

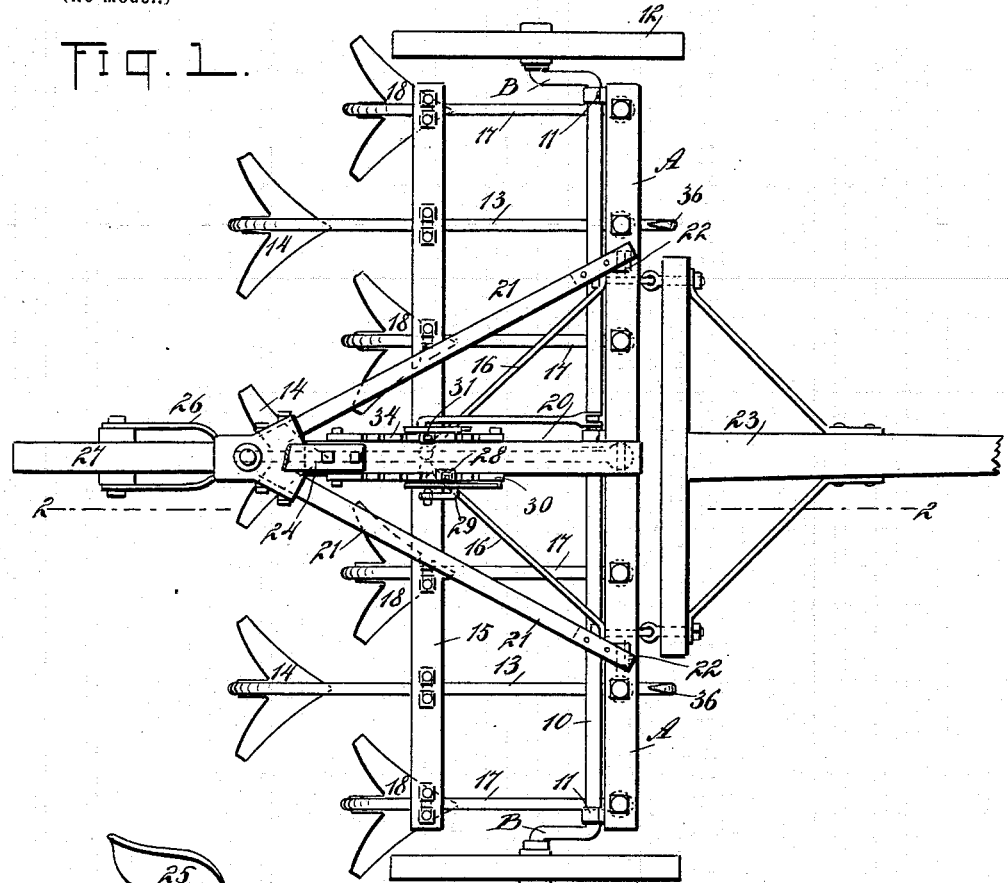

WILLIAM H. SAYER, OF ADAMS, OREGON.

CULTIVATOR.

SPECIFICATION forming part of Letters Patent No. 612,277, dated October 11, 1898.

Application filed December 1, 1897. Serial No. 660,393. (No model.)

*To all whom it may concern:*

Be it known that I, WILLIAM H. SAYER, of Adams, in the county of Umatilla and State of Oregon, have invented a new and useful Improvement in Cultivators, of which the following is a full, clear, and exact description.

The object of my invention is to provide a cultivator which will be simple, inexpensive, and durable and which may be adjusted in a manner to cause the shovels to travel at any desired depth or carry the shovels entirely out of the ground.

Another object of the invention is to provide a cultivator in which the shovels are arranged in gangs, one set being at the rear of the other, the shovels of the rear set intervening the shovels of the forward set.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a plan view of the improved implement, and Fig. 2 is a vertical section on the line 2 2 of Fig. 1.

Upon the main beam A the crank 10 of a crank-axle B is journaled through the medium of suitable bearings 11, the ends of the crank-axle carrying the main supporting-wheels 12 of the machine or implement. The shanks 13 of cultivator-blades 14 are secured to the bottom portion of the main beam A in any suitable or approved manner. These shanks extend rearwardly and at their rear ends are curved downwardly and forwardly, and the cultivator-blades are provided with a wing at each side, the bottoms of the blades in their entirety being more or less level or straight.

The rear cross-bar 15 is connected by bolts, preferably U-bolts, with each of the shanks 13, and the rear cross-bar is connected with the forward beam A by means of braces 16 or their equivalents, whereby the two beams are sustained at predetermined distances apart. Shorter shanks 17 are attached to the beam A and to the cross-bar 15, the said shanks being located between the longer shanks 13, and their rear ends are curved downward in the same manner and carry, preferably, the same style of shovel; but I desire it to be understood that any form of shovel desired may be attached to the aforesaid shanks. The shovels of the shorter shanks are designated by the reference-numeral 18.

What is usually known as a "rudder-beam" 20 is hinged to the main beam A, and from the rear of the rudder-beam braces 21 are forwardly projected, one at each side, and the forward ends of these braces likewise have a hinged connection with the main beam A, the hinges connecting this upper structure being designated as 22. A pole 23 has a pivotal connection with the main beam A, as is particularly shown in Fig. 1, and on the rudder-beam, at its rear, the support 24 for the seat 25 is located, while from the under portion of the rear end of said rudder-beam a bifurcated hanger 26 is downwardly and rearwardly projected, between the members of which a third supporting-wheel 27 is journaled, the said wheel being of less diameter than the main supporting-wheels 12.

A lever 28 is fulcrumed at the right-hand side of the rudder-beam, and this lever is connected by a link 29 with the cross-bar 15, at or near the center of the latter. The lever 28 is provided with the usual thumb-latch for engagement with a rack 30. At the opposite side of the rudder-beam a second lever 31 is fulcrumed, connected by pivotally-attached links 32 with the crank-arm 33 of the crank-axle B. This second lever 31 is also provided with a thumb-latch 35 for engagement with a rack 34.

In operation when it is desired to raise or lower the cultivator-blades to a slight extent the lever 28 is operated; but when the said blades are to be carried deeply into the ground or are to be raised entirely from engagement with the ground the lever 31 is brought into action, which will carry the crank-arm of the crank-axle either to a horizontal or to an upright position, as required.

The entire construction is simple, durable, and economic, and with the assistance of an implement of this character the ground may be efficiently cultivated, and said implement may likewise be employed as a weed-cutter, if desired.

Hooks 36 are shown as attached to the front beam A, at each side of its center, to which singletrees may be attached, if desired, so that the implement may be drawn by four instead of by two animals, if it be desirable.

Having thus described my invention, I claim as new and desire to secure by Letters Patent—

1. In a cultivator, the combination with a main frame, a crank-axle mounted therein, wheels on the axle, and cultivator-shanks carried by the frame, of an auxiliary wheel-supported frame having its forward end pivotally connected to the main frame, an adjusting-lever on the main frame, and a connection between the lever and the crank-axle, substantially as described.

2. In a cultivator, the combination, with a main frame, comprising a front beam and a rear cross-bar, connections between the same, and a crank-axle journaled upon the front beam, carrying supporting-wheels at its ends, and shanks attached to said front beam and cross-bar, the said shanks being adapted to carry the cultivator-blades, of an upper frame having a hinged connection with the main frame, a wheel supporting the upper frame and tracking between the wheels of the main frame, and levers carried by the upper frame, one connected with the cross-bar of the main frame and the other with the crank-axle, for the purpose described.

3. In a cultivator, the combination, with a front or main frame, a cross-bar, braces connecting the same, the two parts forming the main frame of the implement, a crank-axle journaled upon the front or main beam, ground-wheels carried by the said axle, shanks attached to the main frame, extending rearwardly therefrom, the said shanks being alternately of different lengths, and cultivator or weeding blades carried by the lower ends of the shanks, of an upper frame hinged to the main beam of the main frame, a wheel supporting the rear end of the upper frame, levers fulcrumed upon the upper frame, one of which is attached to the cross-bar of the main frame and the other to the crank-axle, and locking devices for the said levers, for the purpose described.

4. A cultivator, comprising a main frame consisting of cross-bars and connecting-braces, a crank-axle mounted on the front cross-bar and provided with an arm, wheels on the axle, a draft device secured to the front cross-bar, cultivator-shanks secured to the cross-bars of the frame, an auxiliary frame having its front end hinged to the front cross-bar of the main frame, a wheel supporting the rear end of the auxiliary frame, an adjusting-lever, a link connecting the lever with the rear cross-bar of the frame, a second adjusting-lever, and a link connecting the lever with the arm of the crank-axle, substantially as herein shown and described.

WILLIAM H. SAYER.

Witnesses:
P. T. HALES,
CHAS. W. KEEN.